May 31, 1960

H. B. DYER 2,938,635

JACK CARRIED MECHANISM FOR FACILITATING
REMOVAL, REPAIR AND REPLACEMENT
OF VEHICLE CARRIED UNITS

Filed July 22, 1957

INVENTOR.
Howard B. Dyer,
BY
Raymon E. Rousseau,
ATTORNEY

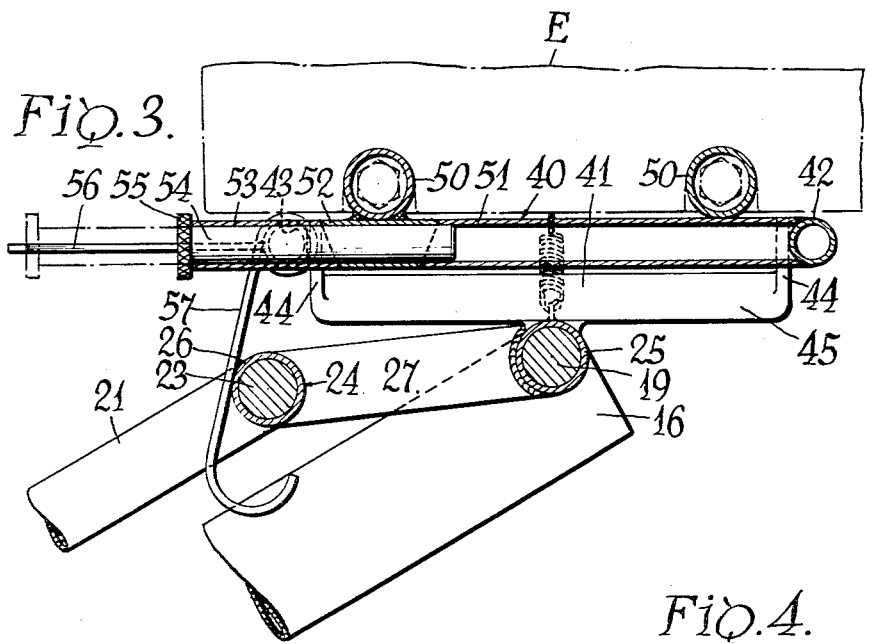
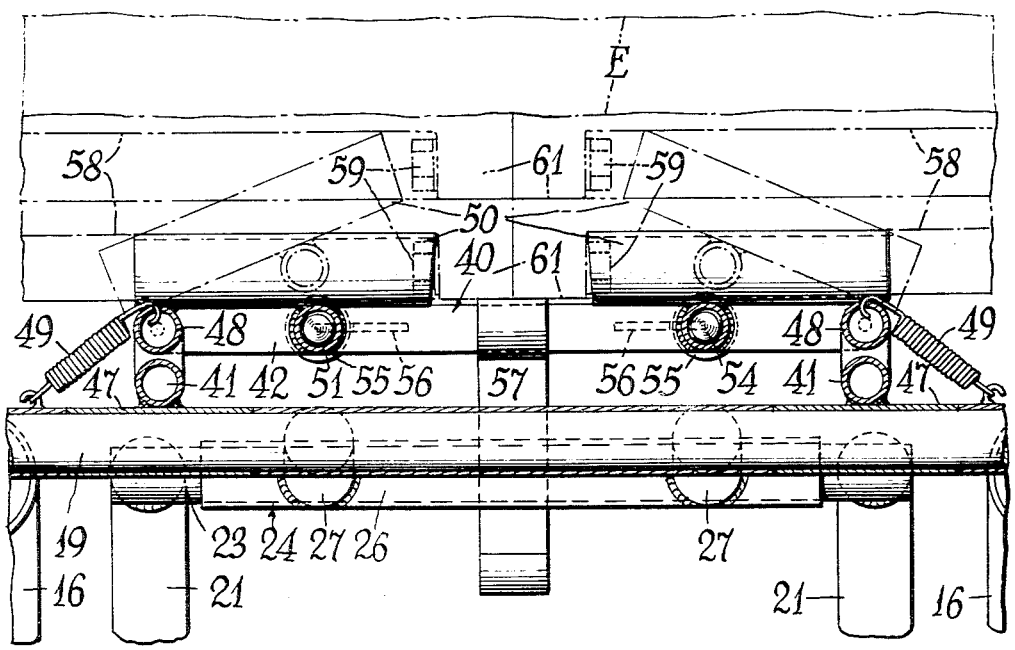

INVENTOR.
Howard B. Dyer,
BY
Raymon E. Rousseau
ATTORNEY.

United States Patent Office 2,938,635
Patented May 31, 1960

2,938,635
JACK CARRIED MECHANISM FOR FACILITATING REMOVAL, REPAIR AND REPLACEMENT OF VEHICLE CARRIED UNITS

Howard B. Dyer, North Tonawanda, N.Y., assignor to James J. Kelly, South Wales, N.Y.

Filed July 22, 1957, Ser. No. 673,361

10 Claims. (Cl. 214—1)

My invention relates to manually operable hoists or jacks and more particularly to jack carried mechanism adapted to be positioned beneath an automotive vehicle for automatically engaging and holding a major component unit of the vehicle during its removal therefrom, during repairs and during its re-installation in the vehicle.

The prior hoists or jacks of which I am aware have not been provided with mechanism for automatically engaging and holding a major unit of a vehicle and have been objectionable in that they have required laborious and time consuming efforts of a skilled mechanic and usually require that the mechanic be assisted by another mechanic or helper in removing and replacing the unit os that repairs which make it necessary to remove the unit have been costly due to the presently high cost of labor.

The objects of my invention are (1) to provide a strong and rugged low cost jack carried mechanism which may be positioned beneath a unit carried by a vehicle and operated by a single mechanic to engage, securely hold and support said unit during its removal from the vehicle, during necessary repairs and during its re-installation in the vehicle; (2) to provide such jack carried mechanism with means for automatically engaging and securely holding an automotive unit by and during its upward movement from a lowered position to an elevated position; (3) to provide means for pivotally securing such mechanism to the jack in a manner allowing it to have limited rocking movement to accommodate itself to the inclination of the unit resulting from elevation of the unit carrying end of the vehicle; (4) to provide a lock means operable to lock said automatic means to prevent adventitious movement of the unit on the mechanism during removal, repair and re-installation of the unit in the vehicle and operable to unlock said automatic means, to allow removal of the unit.

These and other objects and advantages of my improved jack carried mechanism and jack will become apparent from a perusal of the following specification and the drawings.

Figure 3 is an enlarged cross sectional view taken about on the line 3—3 of Figure 1.

Figure 4 is an enlarged cross sectional view taken about on the line 4—4 of Figure 1.

Figure 7:
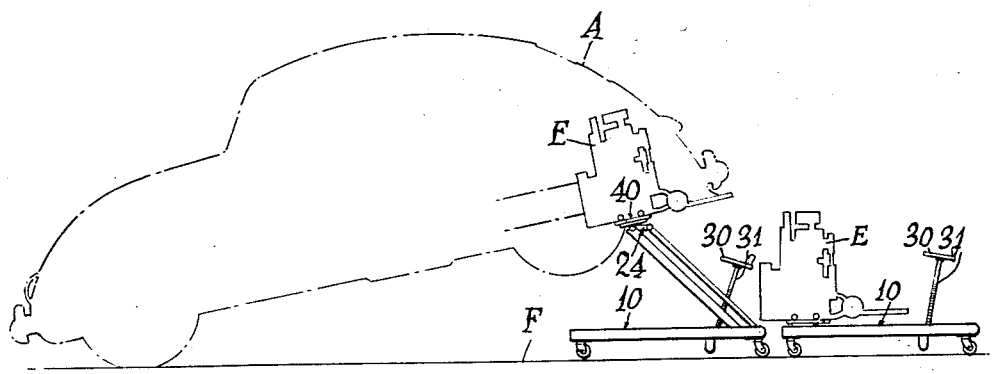
Figure 5:
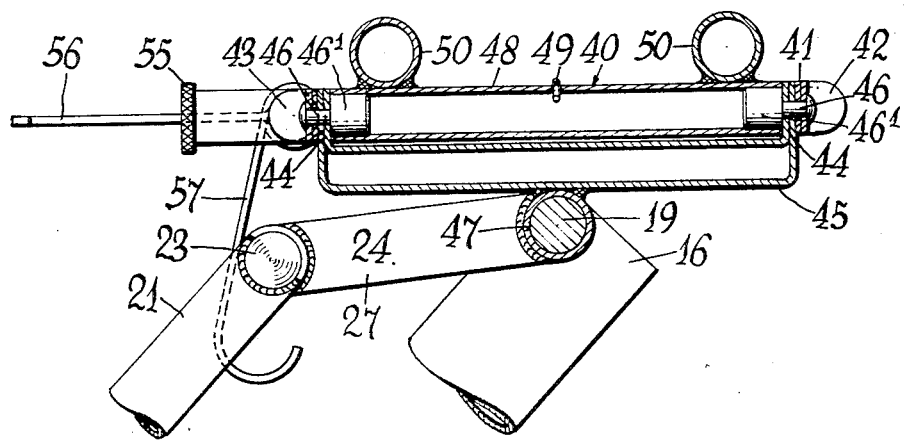
Figure 5 is an enlarged cross sectional view taken about on the line 5—5 of Figure 1.
Figure 6:
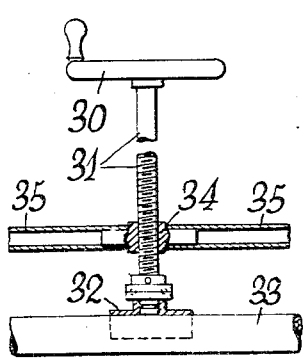
Figure 6 is a fragmentary combined sectional and elevational view showing a preferred means for operating the jack to raise and lower my jack carried mechanism.

Figure 7 is a side elevational view showing my jack carried mechanism supporting a schematically shown automobile engine unit in a lowered position rearwardly of the elevated rear end of an automobile and also shows my jack carried mechanism moved and positioned beneath the elevated rear end of the automobile and elevated by the jack to support the engine in a position allowing its removal from and its replacement in the automobile.

Generally stated my unit engaging and holding mechanism is carried by a suitable jack preferably having a caster wheel mounted base, a parallel link type of manually operable elevating mechanism carried by the base for movement between lowered and raised positions and, being rockably secured to the link mechanism to accommodate itself to the inclination of a vehicle carried unit, to be supported thereon, includes means by and during its upward movement by the jack for automatically engaging and holding the unit thereon and a lock means operable to lock the automatic means against adventitious movement of the unit and operable to unlock and allow the automatic means to be automatically disengaged from the unit by and during downward movement away from said unit.

Referring now to the drawings: a suitable low cost jack, generally indicated by the numeral 10, includes a U-shaped frame 11 having each of the outer ends of its side members 12 and the juncture between its members 12 and its bight portion 13 provided with suitable caster wheels 14 which support the frame 11 in spaced parallel relation to a floor F and allow it to be rolled from place to place.

Figure 1:
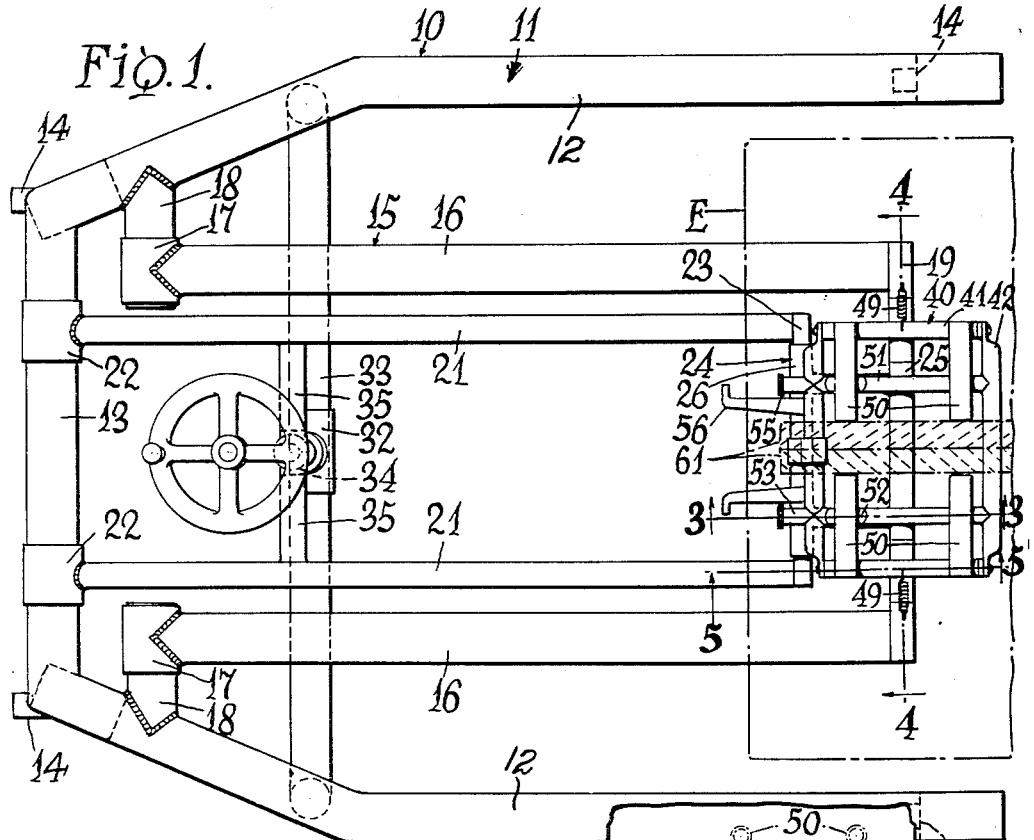
Figure 1 is a plan view showing my jack carried mechanism in its lowermost position with its automatic means locked and engaging and holding a unit, schematically shown in broken lines.
Figure 2:
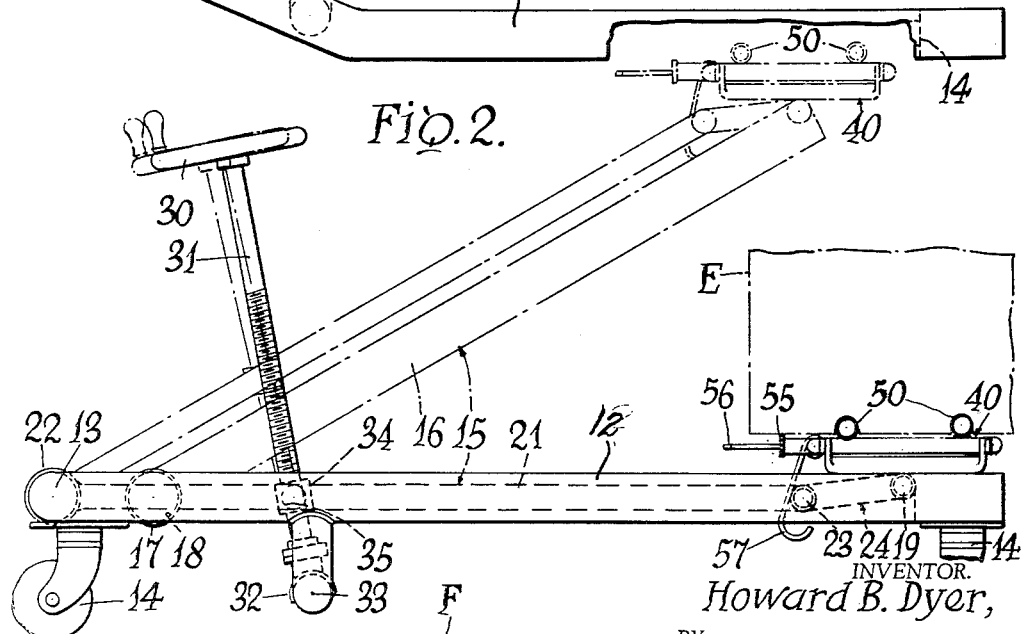
Figure 2 is a side elevational view of Figure 1 and also shows, by dot and dash lines, my jack carried mechanism in an elevated position.

The frame 11 carries a parallel link type of elevating mechanism 15 which as best shown in Figures 1 and 2 includes a main pair of spaced parallel links 16 each having one end formed as at 17 and pivotally connected to transversely alined pivot arms or trunnions 18 rigidly secured to the side members 12 a predetermined distance forwardly of and parallel to the bight portion 13 and each having their opposite ends connected together by a bar 19. Another pair of closer spaced parallel links 21, each having one end formed as at 22, are pivotally connected to the bight portion 13 and have their opposite ends connected together by a bar 23. The links 16 and 21 are parallel and, being of the same length, the bars 19 and 23 are parallel and spaceable one from the other a distance equal to the spacing of the trunnions 18 from the bight portion 13. An H-shaped tubular frame 24 connects and spaces the bars 19 and 23, the required predetermined distance, and to allow the necessary swinging motion of the links with respect to the frame 24, one tubular side 25 of the frame is journaled on the medial portion of the bar 19 and its other tubular side 26 is journaled on the medial portion of the bar 23. The sides 25 and 26 of the frame 24, being journaled on the parallel bars 19 and 23, are parallel and being rigidly connected together by a pair of spaced tubular elements 27 (Figures 3 and 4) complete the parallel link mechanism. It will now be apparent that the pairs of levers or links 16 and 21 and the frame 24 may be swung upwardly from the lower position shown in dotted lines in Figure 2 to other selected raised positions (one of which is shown in dot and dash lines in Figure 2) as by any suitable link mechanism operating means. I presently prefer using a link mechanism operating means which includes a handwheel 30 secured to a screw 31 which is rotatably carried by a saddle 32 rockably supported upon a cross brace 33 secured to the side members 12, and which has threaded engagement with a threaded block 34 rockably carried by the inner ends of tubular cross braces 35 rigidly secured between the links 21, so that rotation of the screw 31 in the block 34 causes parallel swinging motion of the links 16 and 21 and upward or downward motion of the frame 24.

Important features of my invention reside in providing a suitable jack with an automotive unit engaging and holding mechanism which is rockably secured to the jack to accommodate itself to the inclination of the unit resulting from elevating the end of the vehicle which carries the unit, in providing said mechanism with means which are automatically operable by and during engagement with the vehicle carried unit for engaging and holding the unit thereon and which by and during disengagement therefrom automatically release the unit, and in providing a lock means manually operable to lock the automatic means to prevent adventitious movement of the unit thereon and manually operable to release the automatic means to allow its automatic disengagement from the unit.

A presently preferred from of automotive unit engaging, holding and supporting mechanism is generally indicated by the numeral 40 and includes a strong and light rectangularly shaped frame 41 preferably formed of tubular parallel side members 42 and 43 having their ends rigidly secured to the flattened upturned end portions 44 of tubular end members 45 by double headed pins 46. The end members 45 intermediate their flattened ends are each rigidly secured upon short tubular parallel cross members 47 which are axially alined with and journaled on the bar 19 so that the frame 41 may be rocked thereon for a purpose to be hereinafter described. Another tubular end member 48 fits between each pair of the portions 44 and is journaled on the inner heads 46' of the pins 46 in superposed spaced parallel relation to the associated member 45, to allow the members 48 to be freely swung about the axis of the pins.

A pair of tension springs 49 each have one of their ends anchored to the link mechanism and each have their opposite end engaged with the medial portion of one of the members 47, so that spaced pairs of parallel tubular sockets 50, each pair of which have their outer ends rigidly secured upon one of the members 47, are resiliently held in the inwardly and upwardly inclined normal position shown in dot and dash lines in Figure 4.

In order to limit inward and downward swinging motion of the sockets 50 from their normal (dot and dash line) position to their active full line position (Figure 4) in which they engage, hold and support a unit shown in broken lines, the side members 42 and 43 may be connected together by spaced tubular cross members 51 which are positioned to stop the sockets in their active position, however to provide a simple lock for preventing adventitious movement of the sockets from their active position, the cross members 51 are each preferably formed with a removable wedge-shaped tubular section 52 which is rigidly secured to one of each pair of the sockets 50 so as to be engaged and supported in a like wedge-shaped space located between the adjacent inner ends of the member 51 and axially alined therewith and with a coaxial extension 53 thereof when the sockets are in their active position (see Figure 3).

A headed pin 54 is slidably mounted in each extension 53 and, being of a length to extend therethrough, through the section 52 and into the member 51 when positioned as shown in full lines in Figure 3, serves to effectively lock the sockets in their active unit engaging, holding and supporting position. During withdrawal of each pin 54 to the dot and dash line position shown in Figure 3, their enlarged heads 55 engage an associated stop 56 and the sockets 50 are automatically moved to and resiliently held in the dot and dash line normal position of Figure 4 by the springs 49.

The frame 41 is rockably mounted on the bar 19 of the link mechanism 15 for limited rocking movement. Such rocking movement of the frame in a counterclockwise direction, as viewed in Figure 3, is limited by the frame 41 engaging the frame 24 and in a clockwise direction, in the same figure, is limited by a hook member 57, pivotally carried by the frame 41, engaging the side 26 of the frame 24 to prevent overbalancing of the unit.

The purpose of this limited rocking movement of the frame 41 is to allow it to accommodate itself to the inclination of a unit to be engaged and held thereon and to facilitate removal from and replacement in an automotive vehicle A of a unit which, for example, may be an internal combustion engine E. The engine E, being operably and detachably connected to driven units by a suitable splined connection (not shown) has its base formed with alined pairs of spaced grooves 58 which provide access to the bolts 59 for holding the mating flanges 61 of the engine together and in which the spaced pairs of sockets 50 fit and embrace the heads of the bolts 59.

When it is desired to remove the engine from the vehicle the frame 41 is positioned in its lowermost position with the sockets 50 resiliently held in their normal position by the springs 49, and a mechanic without assistance may then roll my jack under the elevated engine carrying end of the vehicle and beneath the engine, then operate the link mechanism to raise the frame 41 and maneuver the jack until the inner ends of the inclined sockets 50 engage in the grooves 58, then further raise the frame 41 so that it accommodates itself to the inclination of the engine and the sockets 50 automatically fully engage in the grooves 56 and embrace the heads of the bolts 57, then operate the locking pins to lock the frame 41 to the engine (Figure 7), then remove the engine fastenings and slightly rock the frame and raise it during rearward movement of the jack to uncouple the driving connection between the engine and a driven part, whereupon the engine is supported in an elevated position by the jack, then the jack is fully lowered to allow it and the engine to be moved from beneath the vehicle to another place where repairs to the engine are made.

It will be obvious that the engine may be readily reinstalled in the vehicle by a mechanic without assistance by performing the above described operations in reverse order.

My jack not only materially reduces the time and labor usually required to remove and reinstall an automotive unit, e.g., an internal combustion engine in a motor vehicle, but provides a convenient means for storing such units awaiting repairs and also provides a selectively positionable unit holding means which allows a great many repairs to be made without transferring the unit to any other unit holding means known as a work stand.

It should be understood that the herein shown and described form of my invention is intended to exemplify its principles and that various modifications and rearrangements of its component parts may be made within the scope of the appended claims.

I claim:

1. The combination with an automotive type of jack having a part movable between raised and lowered positions, of mechanism rockably secured on said movable part to automatically accommodate itself to the angle of surfaces of a vehicle carried automotive unit by and during its engagement with said unit, said mechanism including a frame pivotally mounted on the movable jack part for limited up and down rocking movement thereon about a horizontal axis, socket means pivotally mounted upon the frame for swinging movement from an inwardly and upwardly inclined position to a horizontal position normal to the horizontal axis of the frame, and resilient means normally acting between the frame and the socket means to resiliently hold the socket means in said inclined position, whereby by and during upward movement of the mechanism by the jack into engagement with the vehicle carried unit the inclined resiliently held socket means first engage the unit and upon further upward movement of the mechanism automatically move to said horizontal position in which they fully engage, support and securely hold the unit thereon, while it is disconnected from the vehicle and moved with the jack to another place for repairs or storage and during its replacement in the vehicle and whereby upon removal of the unit from the mechanism the resilent means acts to automatically restore the socket means to its normal inclined position.

2. The combination set forth in claim 1 wherein the frame is provided with engage and stop means formed and arranged to stop the socket means in their full unit engaging, supporting and holding horizontal position.

3. The combination set forth in claim 1 wherein the frame is provided with combined stop and lock means, the latter being operable to engage and lock the socket means in their full unit engaging, supporting and holding horizontal position, thereby preventing adventitious movement of the unit thereon, and being operable to unlock the socket means to allow their automatic return to their inclined position by the resilient means when the mechanism is disengaged from the vehicle carried unit.

4. The combination set forth in claim 3 wherein the frame is provided with lock stop means formed and arranged to limit unlocking movement of the lock means to a movement insufficient to allow bodily removal or loss of the lock means.

5. The combination set forth in claim 1 wherein the frame is provided with stop means for limiting its rocking movement on the jack, to an extent allowing sufficient rocking movement of the frame together with a unit secured thereon to facilitate disengagement and reengagement of a driving connection between the unit and another vehicle carried part.

6. A mechanism for automatically engaging, supporting and securely holding an automotive unit during its removal from an automotive vehicle for repairs or storage and during its replacement in the vehicle comprising a frame formed to be rockably secured upon an upwardly and downwardly movable jack part for limited but free up and down rocking movement thereon about a horizontal axis, thereby to automatically accommodate itself to the angle of surfaces of a vehicle carried automotive unit solely by and during its movement by said jack part, socket means pivotally mounted upon the frame for swinging movement from an inwardly and upwardly inclined position to a horizontal position normal to said horizontal axis for engaging, supporting and holding the unit, and resilient means normally acting between the frame and the socket means to resiliently hold the socket means in said inclined position, whereby by and during upward movement of the mechanism by the jack into engagement with the vehicle carried unit, the inclined resiliently held socket means first engage the unit and then upon further upward movement of the mechanism automatically move to said horizontal position in which they fully engage, support and securely hold the unit on the frame, while said unit is disconnected from the vehicle and moved with the jack to another place for repairs or storage and during its replacement in the vehicle and whereby upon removal of the unit from the mechanism the resilient means acts to automatically restore the socket means to its normal inclined position.

7. The mechanism set forth in claim 6 wherein the frame is provided with stop means formed and arranged to engage, stop and assist in supporting the socket means in their full unit engaging, supporting and holding horizontal position.

8. The mechanism set forth in claim 7 wherein the socket means are provided with stop means formed to interengage with the frame carried stop means when positioned in said horizontal position, and the frame carries lock means operable to lock the interengaged socket and frame carried stop means against separation, thereby to prevent removal of the unit and return movement of the socket means to their inclined position by the resilient means until the lock means are disengaged from the socket carried stop means and the unit is removed from the mechanism.

9. The mechanism set forth in claim 6 wherein the socket means are formed as opposed pairs of axially alined and spaced sockets formed to fully engage in like spaced pairs of alined grooves formed in the unit to provide access to bolts and nuts for securing mating flange parts of the unit together and to embrace the bolt head and nuts thereby securely holding said unit upon the mechanism.

10. The mechanism set forth in claim 6 wherein the frame is provided with means to limit its rocking movement on the jack to an extent allowing sufficient rocking movement of the frame and the unit secured thereon to permit and facilitate disengagement and reengagement of a driving connection between the unit and another vehicle carried part.

References Cited in the file of this patent
UNITED STATES PATENTS

| | | |
|---|---|---|
| 1,264,261 | Blankenship | Apr. 30, 1918 |
| 2,237,853 | Troche | Apr. 8, 1941 |
| 2,362,696 | Hively | Nov. 14, 1944 |
| 2,523,734 | Stephenson et al. | Sept. 26, 1950 |
| 2,628,726 | Van Schie | Feb. 17, 1953 |
| 2,787,476 | Holsclaw | Apr. 2, 1957 |